United States Patent
Sakai et al.

(10) Patent No.: US 12,415,481 B2
(45) Date of Patent: Sep. 16, 2025

(54) FASCIA DOOR AND WASHER FLUID RESERVOIR

(71) Applicant: Honda Motor Co., Ltd., Tokyo (JP)

(72) Inventors: Kunihiro Sakai, Haga-gun (JP); Ritesh Pawar, Maharashtra (IN)

(73) Assignee: HONDA MOTOR CO., LTD., Tokyo (JP)

( * ) Notice: Subject to any disclaimer, the term of this patent is extended or adjusted under 35 U.S.C. 154(b) by 408 days.

(21) Appl. No.: 18/056,053

(22) Filed: Nov. 16, 2022

(65) Prior Publication Data

US 2024/0157913 A1  May 16, 2024

(51) Int. Cl.
*B60S 1/50* (2006.01)
*B60R 19/48* (2006.01)

(52) U.S. Cl.
CPC .............. *B60S 1/50* (2013.01); *B60R 19/48* (2013.01)

(58) Field of Classification Search
CPC ......... B60S 1/50; B60R 19/023; B60R 19/18; B60R 2019/1886; B60R 13/04; B60R 19/48; B60K 2015/0523
USPC .......... 296/1.07, 193.08, 1.08; 293/102, 120, 293/121
See application file for complete search history.

(56) References Cited

U.S. PATENT DOCUMENTS

| | | | |
|---|---|---|---|
| 5,000,501 A * | 3/1991 | Cunha ................... | B60J 7/08 29/401.1 |
| 5,460,420 A * | 10/1995 | Perkins ................... | B60S 1/50 293/106 |
| 6,044,517 A * | 4/2000 | Zendler ................... | B60S 1/50 239/284.1 |
| 6,206,252 B1 | 3/2001 | Broadus | |
| 6,598,914 B1 * | 7/2003 | Dixon .................... | B60R 19/48 296/180.1 |
| 8,851,102 B2 | 10/2014 | Lacoste et al. | |
| 8,973,208 B2 | 3/2015 | Kargilis | |
| 2004/0142232 A1 * | 7/2004 | Risca .................... | B60R 16/04 429/100 |
| 2008/0257984 A1 | 10/2008 | Petrunya | |
| 2017/0028932 A1 | 2/2017 | Slank | |
| 2022/0314901 A1 * | 10/2022 | Wittmann ............... | B60R 13/04 |
| 2024/0132008 A1 * | 4/2024 | Pentia .................... | B60L 53/16 |

FOREIGN PATENT DOCUMENTS

| | | | | |
|---|---|---|---|---|
| DE | 19933512 A1 * | 1/2001 | ......... | B60C 23/0406 |
| DE | 102018205999 A1 | 10/2019 | | |
| DE | 102019006970 A1 | 7/2020 | | |
| EP | 3831674 A1 | 6/2021 | | |
| GB | 2328915 A * | 3/1999 | ............ | B60K 15/00 |
| JP | 2006028829 A | 2/2006 | | |
| JP | 2006341834 A | 12/2006 | | |
| JP | 2016013784 A | 1/2016 | | |
| KR | 19980037569 A | 8/1998 | | |
| KR | 200151740 Y1 | 7/1999 | | |
| KR | 102238830 B1 | 4/2021 | | |

* cited by examiner

*Primary Examiner* — Amy R Weisberg
*Assistant Examiner* — Denise Lynne Esquivel
(74) *Attorney, Agent, or Firm* — Plumsea Law Group, LLC (57) ABSTRACT

A fascia door assembly including: a fascia door support bracket having a support bracket opening; a fascia door bracket coupled to the fascia door support bracket and having a bracket opening; and a fascia door engaged with the fascia door bracket in the bracket opening, the fascia door having an opened position in the bracket opening and a closed position in the bracket opening.

18 Claims, 6 Drawing Sheets

FASCIA DOOR AND WASHER FLUID RESERVOIR

BACKGROUND

1. Field of the Disclosure

The present disclosure relates to a fascia door concealing a washer fluid reservoir, and more particularly to a fascia door concealing a washer fluid reservoir mounted behind a rear fascia of a vehicle.

2. Description of Related Art

In many cars, a windshield washer fluid tank is located near a front wheel well, e.g., behind a headlight or in front of a bulkhead or firewall.

The windshield washer fluid tank needs to have convenient accessibility for refill, serviceability, etc. Conventional positioning below a hood gives the advantage of accessibility and safety.

As car design and construction advances, with the increase in demand for electric vehicles, positioning below the hood is no longer convenient, as the space is increasingly used for storage or for high powered electronics.

There is a need in the art for a system and method that positions the windshield washer fluid reservoir in accessible and safe locations for modern vehicles.

SUMMARY OF THE INVENTION

For vehicles with upright windshields, washer fluid usage is relatively higher than for a typical vehicle with an angled windshield. Other types of vehicles may have similarly higher washer fluid usage, such as to clean sensors for parking or navigation, or to clean rear windows. In each of these vehicles, frequent access to a washer fluid reservoir may be needed.

In one aspect, the disclosure provides a fascia door assembly including: a fascia door support bracket having a support bracket opening; a fascia door bracket coupled to the fascia door support bracket and having a bracket opening; and a fascia door engaged with the fascia door bracket in the bracket opening, the fascia door having an opened position in the bracket opening and a closed position in the bracket opening.

In one or more aspects, the disclosure provides a vehicle comprising: a rear fascia having an opening in a horizontal portion of the rear fascia; a washer fluid reservoir behind the rear fascia and below the opening; and a fascia door, wherein the washer fluid reservoir is concealed below the fascia door in a closed position and revealed by movement of the fascia door to an open position.

In another aspect, the disclosure provides a vehicle comprising: a rear fascia having an opening; a washer fluid reservoir behind the rear fascia; and a fascia door assembly comprising: a fascia door support bracket attached to an interior surface of the rear fascia and having a support bracket opening; a fascia door bracket coupled to the fascia door support bracket and having a bracket opening coincident with the opening in the rear fascia and the support bracket opening; and a fascia door engaged with the fascia door bracket in the bracket opening, wherein the washer fluid reservoir is concealed below the fascia door in the opening in the rear fascia.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

According to some aspects, a fascia door conceals a washer fluid reservoir. According to one aspect, the washer fluid reservoir is positioned rear mounted, behind a rear fascia (e.g., a bumper cover) of a vehicle, for example to a chassis cross member, a bumper reinforcement bar, an impact bar, etc. According to one or more aspects, a filler door of the washer fluid reservoir is concealed by a fascia door.

Figure 1:
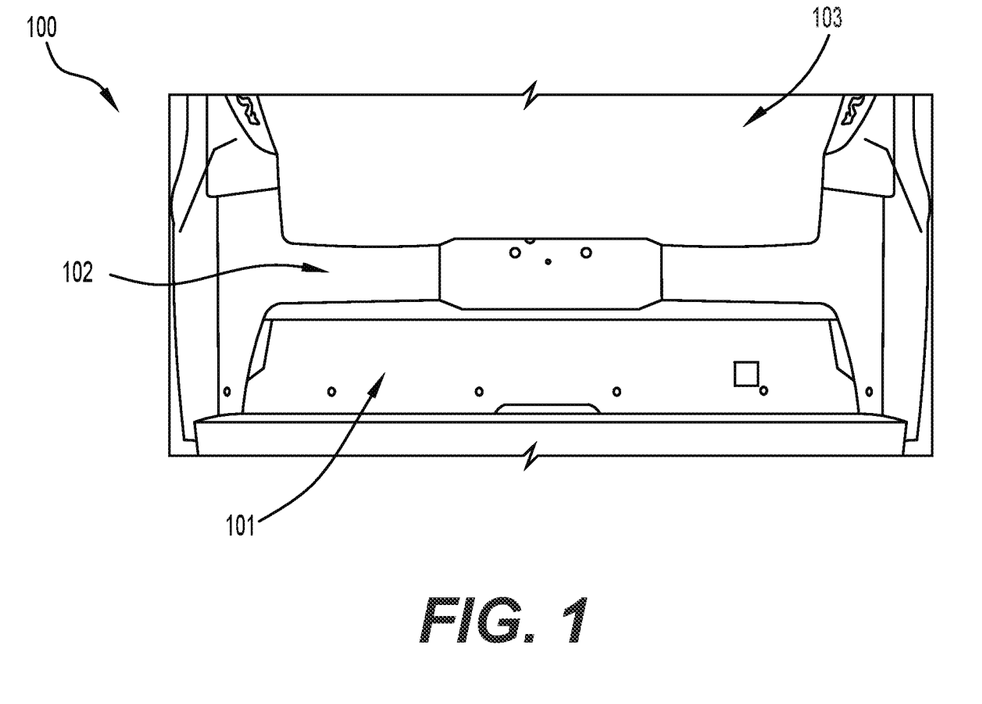
FIG. 1 illustrates an embodiment of a vehicle including a rear fascia.

FIG. 1 illustrates an embodiment of a vehicle including a rear fascia 100. The rear fascia 100 may include a lower fascia portion 101, an upper fascia portion 102, and a horizontal portion (not shown) extending forward from the upper fascia portion 102. The vehicle may include a lift gate 103, which in a closed position conceals at least a portion of the horizontal portion.

Figure 2:
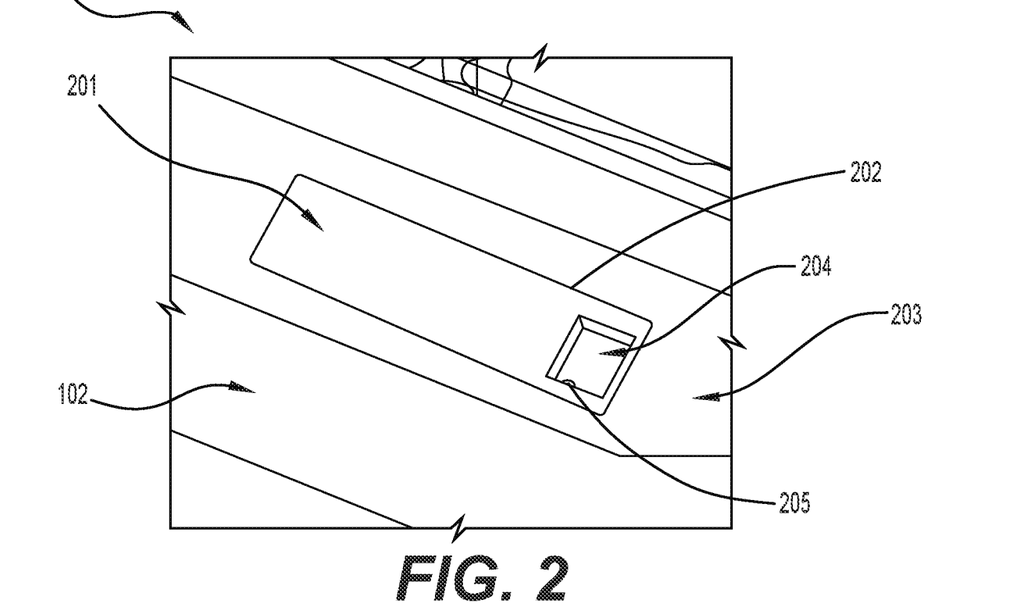
FIG. 2 illustrates an embodiment of a vehicle including a rear fascia including a fascia door in a closed position.

FIG. 2 illustrates an embodiment of the vehicle including the rear fascia 100 including a fascia door 201 in a closed position and disposed in an opening 202 in the horizontal portion 203. The fascia door 201 may be positioned to occupy an opening in the rear fascia 100.

According to some aspects, the opening 202 of the rear fascia 100 is in a horizontal portion of the rear fascia 100 and access to the opening 202 depends on a position of a lift gate of the vehicle. For example, the opening 202 may be complete concealed by the lift gate 103 of the vehicle when the lift gate 103 is in a closed position in a case where the lift gate 103 is hinged at a top or side portion thereof. According to some aspects, when the lift gate 103 is opened, the opening 202 is uncovered by moving the lift gate 103 away from the opening 202.

According to at least one aspect, the fascia door 201 includes a recess 204. The recess 204 may function as a handle, where a user may push on a sidewall of the recess 204 to open or close the fascia door 201. According to one or more aspects, the recess 204 includes a drain hole 205 in a lower portions, which may drain any liquid or debris that may enter the recess 204.

Figure 3:
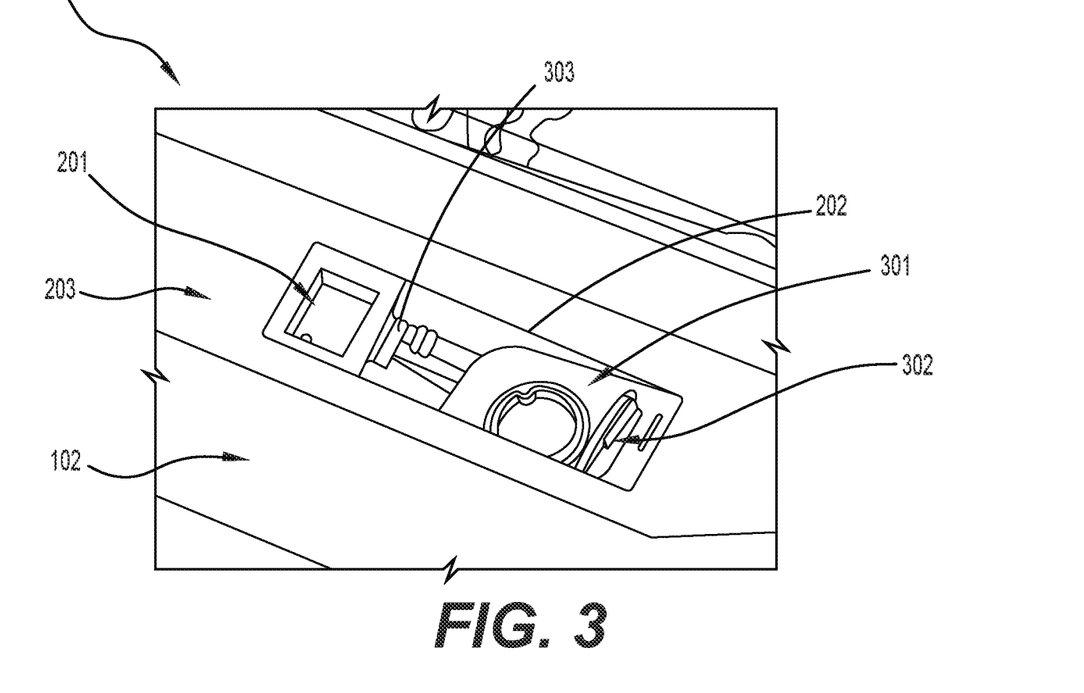
FIG. 3 illustrates an embodiment of a vehicle including a rear fascia including a fascia door in an open position.

FIG. 3 illustrates an embodiment of the vehicle including the rear fascia 100 including the fascia door 201 an open position and revealing a washer fluid reservoir 301 (e.g., a rear mounted washer fluid reservoir) and a filler door 302 for the washer fluid reservoir 301. The fascia door 201 in the open position may reveal at least a portion of the opening 202 in the rear fascia 100.

According to at least one aspect, the fascia door 201 may be disposed to close the opening in the horizontal portion 203 of the rear fascia 100 of the vehicle, concealing, for example, the washer fluid reservoir 301. It should be understood that the horizontal portion 203 may be relatively horizontal as compared to other portions of the rear fascia 100, and that the horizontal portion 203 need not be disposed perfectly horizontal.

According to some aspects, a fascia door assembly comprises a fascia door support bracket, a fascia door bracket, and the fascia door. According to one aspect and referring to FIG. 4, the fascia door support bracket 401 attached to an interior surface 402 of the rear fascia 100. According to one aspect and referring to FIG. 5, the fascia door 201 may be engaged with the fascia door bracket 501. According to some aspects and referring to FIG. 6, the fascia door bracket 501 may be engaged with the fascia door support bracket 401.

According to one aspect and referring to FIG. 4, the fascia door support bracket 401 may be attached to an interior surface 402 of the rear fascia 100, below the horizontal portion 203 of the rear fascia of the vehicle. The fascia door support bracket 401 may be attached to an interior surface 402 of the rear fascia 100 by, for example, an adhesive based bond, mechanical fastenings, ultrasonic assembly, metal inserts, snap fits, electromagnetic and heat welding, etc. The fascia door support bracket 401 may extend along the interior surface of the rear fascia to one or more generally vertical portions of the rear fascia, e.g., to an interior surface of the upper fascia 403, toward a peripheral edge 404 of an opening in the rear fascia 100 extending upward from the horizontal portion. According to some aspects, the fascia door support bracket 401 may include a support bracket opening 405.

According to at least one aspect, the support bracket opening 405 may be coincident with the opening 202 in the rear fascia 100. For example, the fascia door support bracket 401 may be attached to an interior surface 402 of the rear fascia 100, and the support bracket opening 405 may be disposed to allow access to the washer fluid reservoir through the opening 202. The support bracket opening 405 may be larger, the same size, or smaller than the opening 202 in the rear fascia 100.

Figure 4:
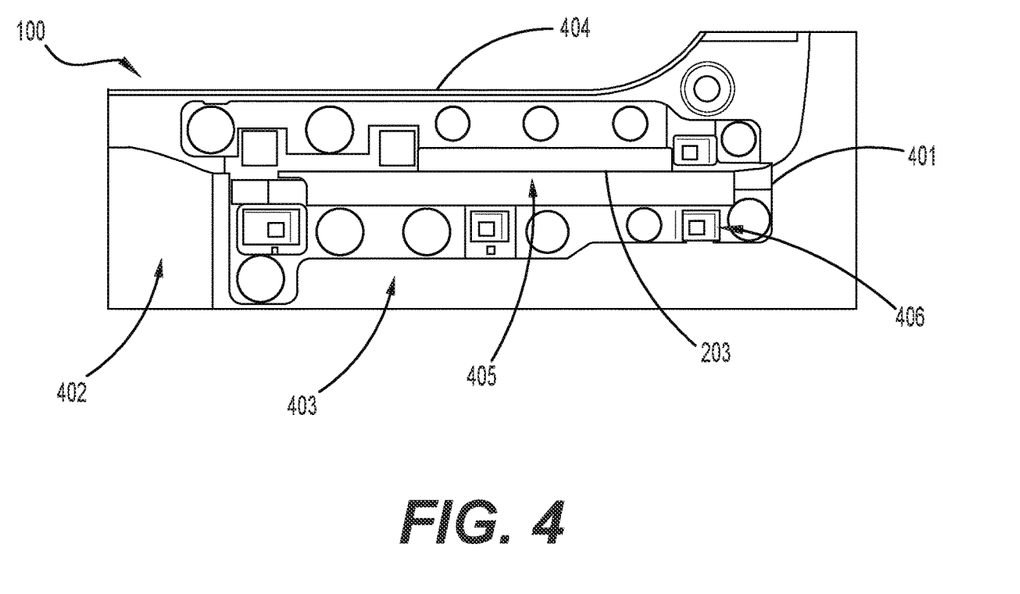
FIG. 4 illustrates an embodiment of a fascia door support bracket attached to an interior surface of a rear fascia

According to one aspect and referring to FIG. 4, the fascia door support bracket 401 may improve the rigidity of the rear fascia 100. For example, the rear fascia 100 and the fascia door support bracket 401 may have a structural rigidity sufficient to withstand loads typically experienced when loading and unloading the vehicle, e.g., with luggage.

Figure 5:
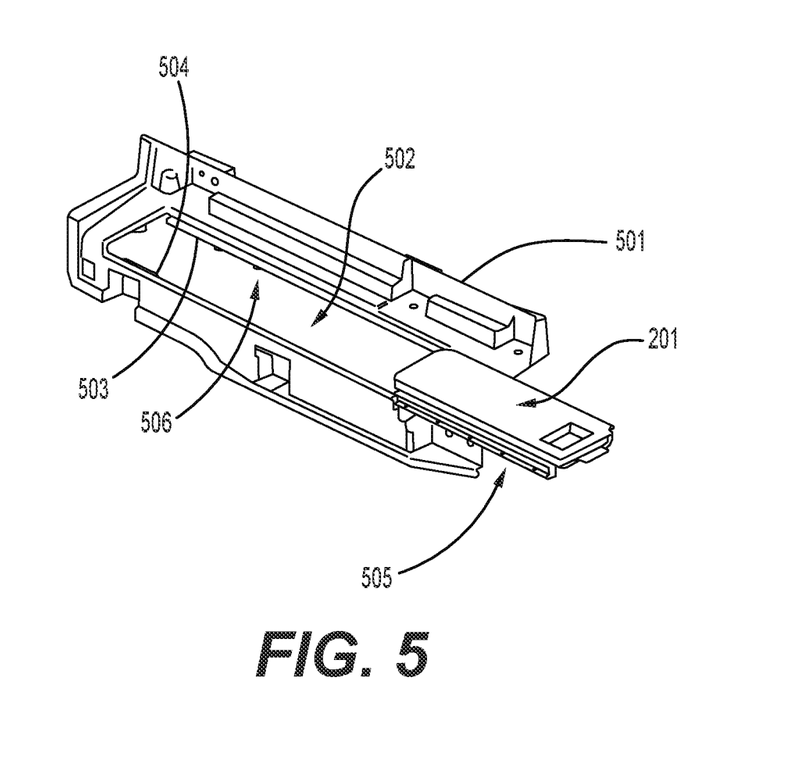
FIG. 5 illustrates an embodiment of a fascia door engaged with a fascia door bracket 501.

According to one aspect and referring to FIG. 5, the fascia door bracket 501 includes a bracket opening 502 and rails (e.g., a first rail 503 and a second rail 504) along at least two parallel edges of the bracket opening 502.

According to one aspect, the fascia door 201 includes at least two projection portions that may be engaged with the rails of the fascia door bracket 501. For example, the projection portions may be "C" channels, which mate with the rails, enabling the fascia door to slide along a length of the opening. According to some aspects, a rail fits between projection portions of a C channel.

While FIG. 5 illustrates an embodiment in which the fascia door 201 includes the C channels and the fascia door bracket 501 includes the rails, the C channels and the rails may be arranged with the fascia door bracket 501 and the fascia door 201, respectively.

According to one aspect and referring again to FIG. 5, the fascia door 201 and the fascia door bracket 501 may each include detents, e.g., fascia door detents 505 and fascia door bracket detects 506, which may engage as the fascia door is moved along the opening, such that the fascia door may be positioned and held in place (e.g., in an open, intermediate, or closed position). In one aspect, the fascia door detents 505 are disposed on an inner surface of the C channel, and the C channel may be resilient, such that the fascia door 201 may be moved along the opening, overcoming an engagement of the detents by a deformation of the C channel.

Figure 6:
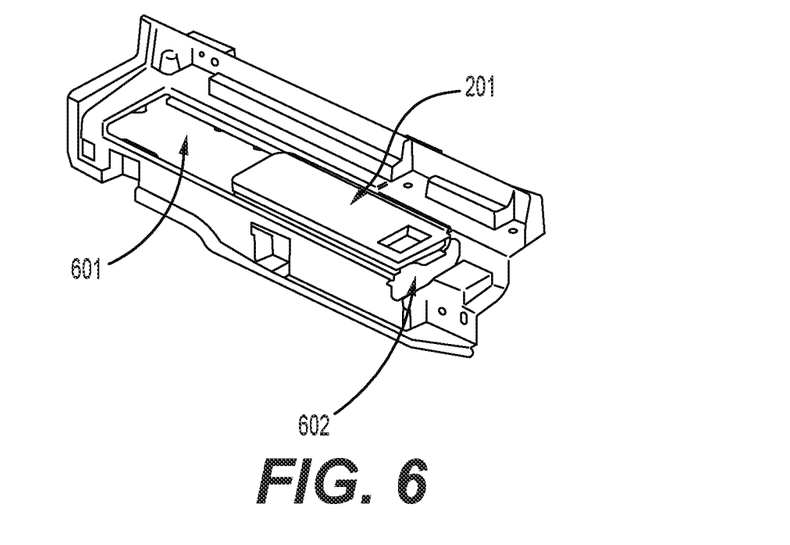
FIG. 6 illustrates an embodiment of a fascia door engaged with a fascia door bracket.

According to some embodiments and referring to FIG. 6, the bracket opening 502 includes a longitudinal portion 601 and a traverse portion 602. The longitudinal portion 601 may extend along a direction of travel of the fascia door 201. The traverse portion 602 may be an opening at an end of the longitudinal portion 601. The traverse portion 602 may enable the C channels of the fascia door 201 to be engaged with the rails, which may extend along the longitudinal portion 601. According to one aspect, first ends of the rails are accessible at the traverse portion 602, such that the C channels of the fascia door 201 may be engaged with the rails.

According to some aspects and referring again to FIG. 7, the fascia door bracket 501 may be coupled with the fascia door support bracket 401, for example, by connecting members (e.g., first connecting member 701). According to some aspects, the connecting members may be bolts, screws, snaps, push type scrivet retainers, etc. According to one or more aspects, the fascia door support bracket 401 includes connecting member receiving portions (see for example, FIG. 4, first connecting member receiving portion 406). The connecting member receiving portions may be engaged by the connecting members, securing the fascia door bracket 501 to the fascia door support bracket 401.

According to one aspect and referring again to FIG. 7, the fascia door bracket 501 fits over the fascia door support bracket 401, and may include a first support bracket vertical portion 702, a second support bracket vertical portion 703, and a support bracket middle portion 704 between the first and second support bracket vertical portions. It should be understood that the support bracket vertical portions are relatively vertical as compared to other portions of the rear fascia 100 or the support bracket middle portion 704, and that the vertical portions need not be disposed perfectly vertical.

Figure 7:
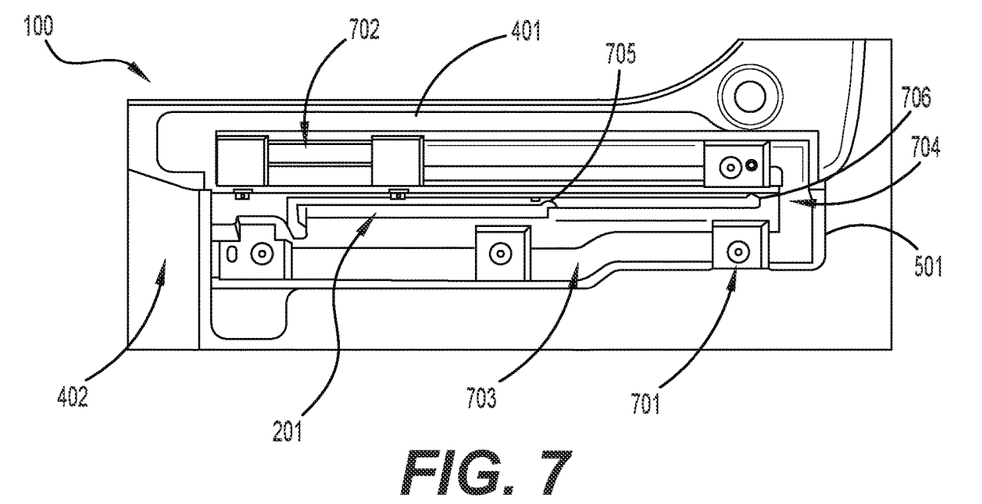
FIG. 7 illustrates an embodiment of a fascia door bracket engaged with a fascia door support bracket.

According to at least one aspect and as illustrated in FIG. 7, the bracket opening 502 (see FIG. 5) may be coincident with the opening 202 in the rear fascia 100 and the support bracket opening 405, enabling the fascia door 201 to be moved between an open position and a closed position. For example, the fascia door bracket 501 may be mounted to the fascia door support bracket 401, and the fascia door support bracket 401 may be attached to an interior surface 402 of the rear fascia 100, wherein the bracket opening 502 and the support bracket opening 405 may be disposed to allow access to the washer fluid reservoir through the opening 202 in the rear fascia when the fascia door 201 is in an open position. The bracket opening 502 may be larger, the same size, or smaller than the opening 202 in the rear fascia 100 and the support bracket opening 405.

According to some aspects, the fascia door 201 includes a resilient catch 705 at an end portion. According to one aspect, the resilient catch 705 may engage with a detent 706 of the fascia door bracket 501 or the horizontal portion 203 of the rear fascia when the fascia door 201 is in an opened position. According to some aspects, the fascia door 201 may include a second resilient catch 303 at another end portion (see FIG. 3) that may engage with a detent of the fascia door bracket or the horizontal portion of the rear fascia when the fascia door 201 is in a closed position.

Figure 8:
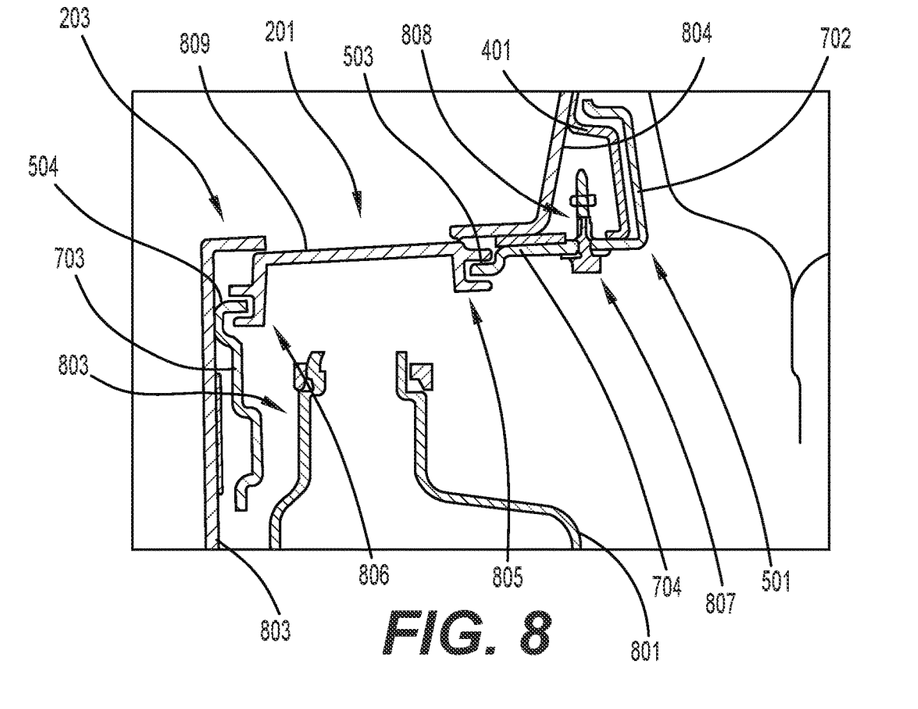
FIG. 8 illustrates an embodiment of cross-section of a fascia door assembly.

According to some aspects and referring to FIG. 8, the fascia door assembly comprises the fascia door support bracket 401, the fascia door bracket 501, and the fascia door 201. According to one aspect, a washer fluid reservoir 801 is disposed below the fascia door 201. The washer fluid reservoir 801 may include a filler neck portion 802 and a filler door (not shown).

According to one aspect and referring to FIG. 8, the fascia door support bracket 401 may be attached to the interior surface of the rear fascia. According to one or more aspects, the fascia door support bracket 401 may extend along the interior surface of the rear fascia to the interior surface of the upper fascia (e.g., first interior surface 803) and the interior surface extending upward from the horizontal portion (e.g., second interior surface 804). According to one aspect, the fascia door bracket 501, including the first support bracket vertical portion 702, the second support bracket vertical portion 703, and the support bracket middle portion 704 between the first and second support bracket vertical portions, fits over the fascia door support bracket 401. According to some aspects, the fascia door bracket 501 may be secured to the fascia door support bracket 401 by connecting members and connect member receiving portions, for example, a second connecting member 807 and second connecting member receiving portion 808.

According to some aspects and referring again to FIG. 8, the fascia door 201 includes a first projection portion 805 and a second projection portion 806, and the fascia door bracket 501 includes the first rail 503 and the second rail 504. According to some aspects, the rails engage with respective projection portions (e.g., first rail 503 engages with first projection portion 805).

According to different aspects, an upper surface 809 of the fascia door 201 may be have a larger area than the opening 202 (as illustrated in FIG. 8), or may have an area that is about the same size, or smaller, than the opening 202, wherein the upper surface 809 may fit inside of the opening 202 when the fascia door 201 is in the closed position.

Figure 9:
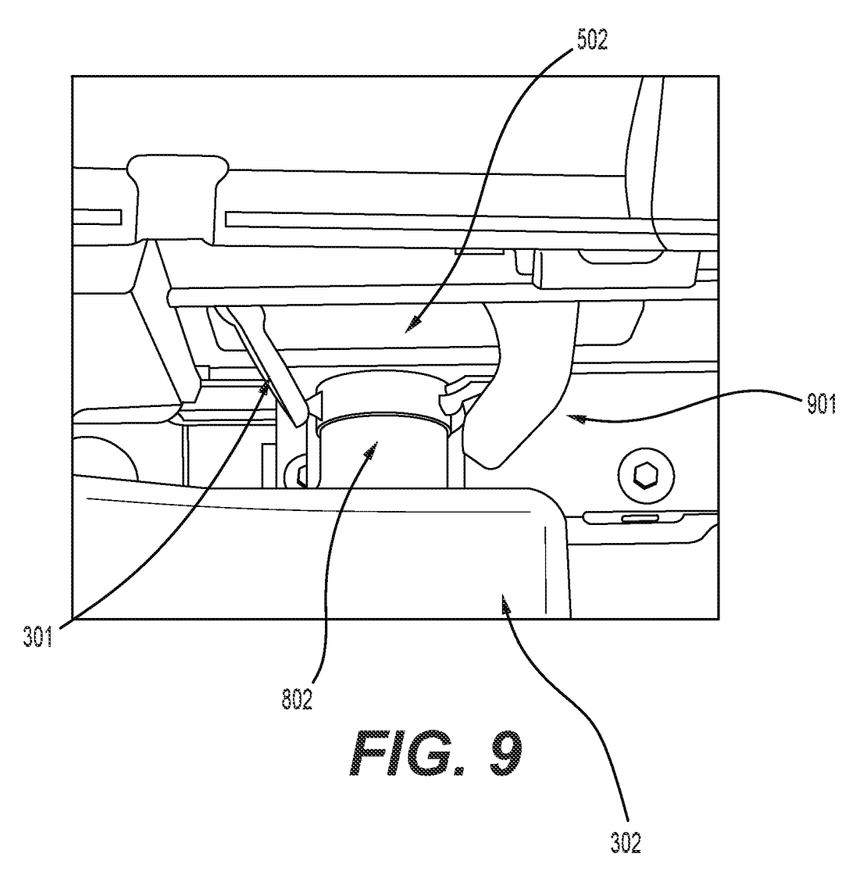
FIG. 9 illustrates an embodiment of a fascia door and a washer fluid reservoir filler door.

FIG. 9 illustrates an embodiment of the washer fluid reservoir 301, the filler door 302, and the filler neck portion 802. FIG. 9 further illustrates a user's finger 901 reaching through the opening in the rear fascia to manipulate (e.g., open or close) the filler door 302 (e.g., by releasing a catch). According to some aspects, the filler door 302 is arranged to open in a direction of the fascia door 201 in an open position in the opening of the rear fascia. According to some aspects, the fascia door may be arranged to close the filler door when the fascia door is moved from the open position to the closed position in the case where the filler door opens toward the fascia door in the open position so a closed state of the filler door 302 can be determined based on the closed position of the fascia door. In some aspects, the filler door 302 opens away from the direction of the fascia door 201 in an open position in the opening of the rear fascia.

According to some aspects, the fascia door is formed on a resilient material that conforms to a requirement for rear fascia, e.g., deflection under load, deflection in a steel ball drop test, etc. According to one aspect, the fascia door assembly including the fascia door support bracket, the fascia door bracket, and the fascia door are configured to withstand loads typically experienced when loading and unloading the vehicle, e.g., with luggage.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A fascia door assembly comprising:
   a fascia door support bracket having a support bracket opening;
   a fascia door bracket coupled to the fascia door support bracket and having a bracket opening; and
   a fascia door engaged with the fascia door bracket in the bracket opening, the fascia door having an opened position in the bracket opening and a closed position in the bracket opening;
   wherein the opening of the rear fascia is in a horizontal portion of the rear fascia and access to the opening depends on a position of a lift gate of the vehicle.

2. The fascia door assembly of claim 1, wherein the fascia door support bracket is attached to an interior surface of a rear fascia of a vehicle, and an opening in the rear fascia is coincident with a portion of the bracket opening.

3. The fascia door assembly of claim 2, wherein the fascia door has an open position and a closed position, and wherein in the closed position the opening in the rear fascia is closed by the fascia door.

4. The fascia door assembly of claim 1, wherein the fascia door comprises a recess.

5. The fascia door assembly of claim 1, wherein the fascia door in a closed position is above a filler door of a washer fluid reservoir.

6. The fascia door assembly of claim 5, wherein the washer fluid reservoir is below a rear fascia of a vehicle.

7. A fascia door assembly comprising:
   a fascia door support bracket having a support bracket opening;
   a fascia door bracket coupled to the fascia door support bracket and having a bracket opening; and
   a fascia door engaged with the fascia door bracket in the bracket opening, the fascia door having an opened position in the bracket opening and a closed position in the bracket opening;
   wherein the fascia door comprises a plurality of projections engaged with respective rails of the fascia door bracket.

8. The fascia door assembly of claim 7, wherein the fascia door comprises a first detent and the fascia door bracket comprises a second detent engaged with the first detent in at least one of the opened position and the closed position.

9. The fascia door assembly of claim 1, wherein the fascia door comprises a resilient catch at an end portion of the fascia door and the fascia door bracket comprises a detent engaged with the resilient catch in one of the closed position and the opened position.

10. A vehicle comprising:
a rear fascia having an opening in a horizontal portion of the rear fascia;
a washer fluid reservoir behind the rear fascia and below the opening; and
a fascia door, wherein the washer fluid reservoir is concealed below the fascia door in a closed position and revealed by movement of the fascia door to an open position.

11. The vehicle of claim 10, further comprising:
a fascia door support bracket attached to an interior surface of the rear fascia and having a support bracket opening; and
a fascia door bracket coupled to the fascia door support bracket and having a bracket opening coincident with the opening in the rear fascia and the support bracket opening, wherein the fascia door is engaged with the fascia door bracket.

12. A vehicle comprising:
a rear fascia having an opening;
a washer fluid reservoir behind the rear fascia; and
a fascia door assembly comprising:
   a fascia door support bracket attached to an interior surface of the rear fascia and having a support bracket opening;
   a fascia door bracket coupled to the fascia door support bracket and having a bracket opening coincident with the opening in the rear fascia and the support bracket opening; and
   a fascia door engaged with the fascia door bracket in the bracket opening, wherein the washer fluid reservoir is concealed below the fascia door in the opening in the rear fascia.

13. The vehicle of claim 12, wherein the fascia door has an open position in the bracket opening and a closed position in the bracket opening closing the opening in the rear fascia.

14. The vehicle of claim 12, wherein the opening of the rear fascia is in a horizontal portion of the rear fascia, wherein access to the opening is concealed by a lift gate of the vehicle in a closed position.

15. The vehicle of claim 12, wherein the opening of the rear fascia is in a horizontal portion of the rear fascia, wherein access to the opening is enabled by a lift gate of the vehicle in an opened position.

16. The vehicle of claim 12, wherein the fascia door comprises a recess.

17. The vehicle of claim 12, wherein the fascia door in a closed position is above a filler door of a washer fluid reservoir.

18. The vehicle of claim 12, wherein the washer fluid reservoir comprises a filler cap, the filler cap configured to open towards the fascia door in an opened position and configured to be closed by the fascia door when the fascia door is moved from the opened position to a closed position.

* * * * *